Sept. 29, 1936. G. H. FRASER 2,055,484
AIR AND OTHER SEPARATOR
Original Filed Feb. 7, 1931
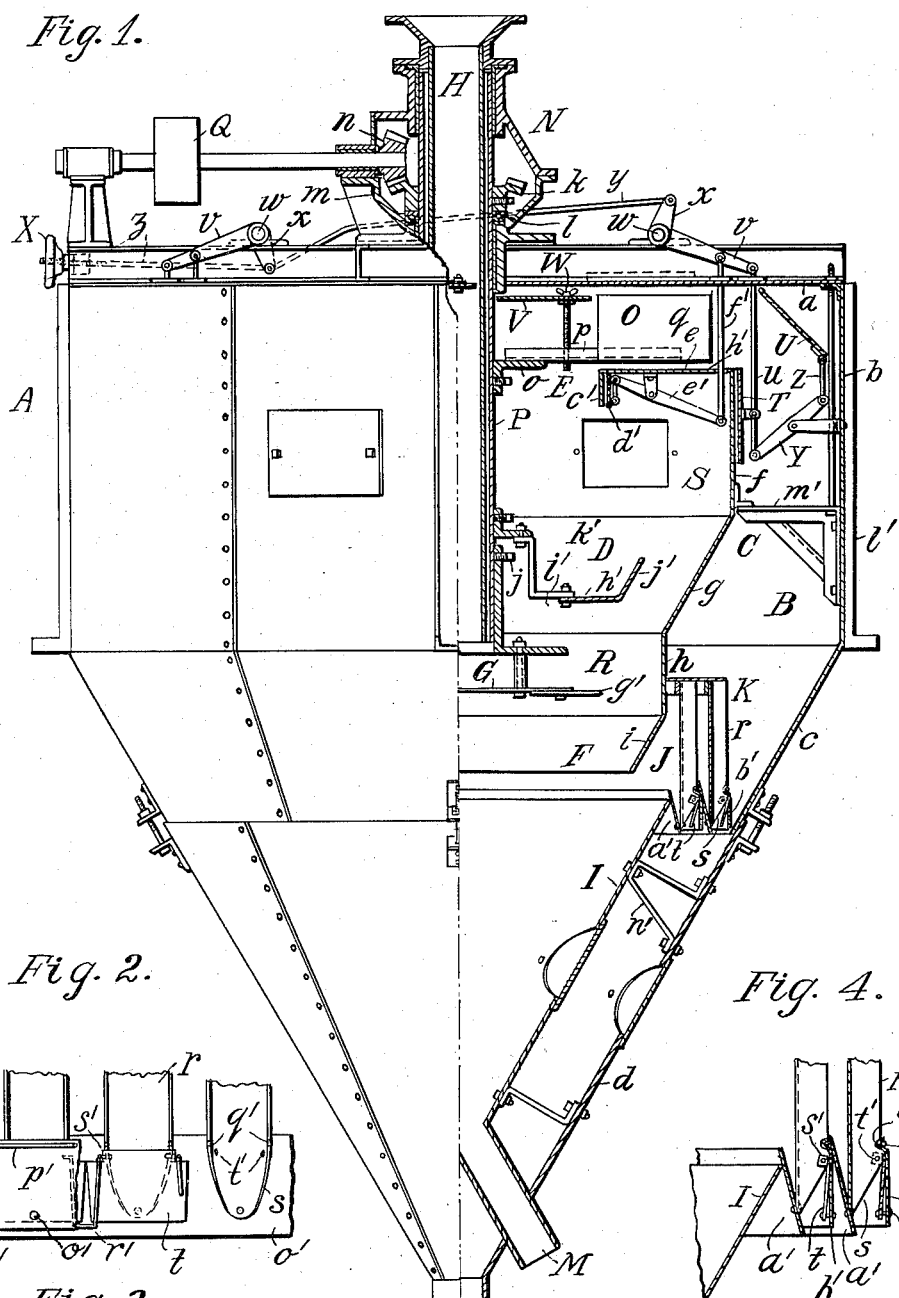
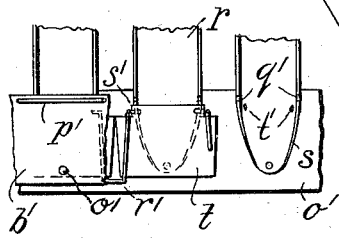
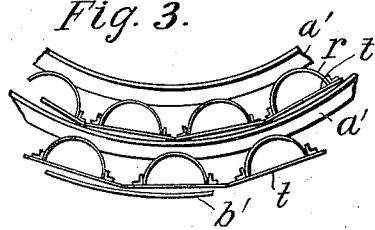
INVENTOR
George Holt Fraser Patented Sept. 29, 1936

2,055,484

UNITED STATES PATENT OFFICE 2,055,484

AIR AND OTHER SEPARATOR

George Holt Fraser, Brooklyn, N. Y.

Application February 7, 1931, Serial No. 514,199
Renewed May 20, 1936

23 Claims. (Cl. 209—139)

This invention relates to separators for grading material by means of a fluid current, and aims to provide certain improvements in such devices.

In air separators comprising an outer casing enclosing a settling chamber and an inner casing enclosing a separating chamber having upper and lower openings communicating with the settling chamber, the material to be separated has been distributed by a rotary distributor, and revolving fan blades have been used between the casings to cause the separating current to flow up through the separating chamber and upper outlet into the settling chamber and return through the lower inlet to separate and float from the separating chamber fine material, and valve means have been provided above the upper outlet and below the fan for reducing the size of the upper outlet opening, and around the lower inlet for varying the space through which the returning current may flow, to vary the fineness of separation, and filter means have been provided around the lower inlet for intercepting fine material floating in the returning current.

One such air separator is shown in my Patent 1,876,516 granted September 6, 1932 on my original application filed September 12, 1924, in which I have claimed radially adjustable distribution means and current space varying means for radially varying distribution of the material to be separated, and radially adjustable current means for radially varying the annular current space in which such material may be distributed, and have shown a non-rotary ring of vertical segments circumferentially slidable on one another for radial adjustment of the ring, as distinguished from the rotary ring of substantially flat radially adjustable segments, radially adjustably mounted on and rotatable with and radially outwardly adjustable around a rotary distributor for rotating with it and adjustably varying the distribution and current space around it, of my present invention; and in my said patent I have shown and claimed circumferentially spaced filter troughs having lower ends connected by an inner continuous valve seat, with hollow outer interiors closed by narrow flapper valves laterally extended only across their faces respectively, and leaving unprotected the circumferential spaces between such troughs, closure of which spaces requires an additional closure element, as distinguished from my present improvement of laterally extended flapper valves each extended laterally across a trough and having laterally contactive edges extended across the space at its sides into lateral contact with adjacent edges of the next valves, and co-operable with these for closing such spaces as well as for closing the spaces within the troughs, for effecting such closure without requiring an additional closure element.

Another such air separator is shown in my Patent 1,542,050 dated June 16, 1925, in which I have shown individual flapper valves within such filter troughs and not across the spaces between them, and vertically extended vertically movable cylindrical valves spaced around and between successive rows of such troughs, for vertically varying the effective height of such troughs, as distinguished from the downwardly and outwardly inclined conical spacer wall between inner and outer rows of troughs for concentrically spacing them and vertically closing the space between the rows and for downwardly and outwardly discharging fine material from between them of my present invention; and in my said Patent 1,542,050 I have shown a downwardly and inwardly inclined conical ring between such filter troughs and within a tailings cone, for closing the space between such troughs and such cone, as distinguished from the upwardly and inwardly extended conical ring within such troughs and around the outer edge of such a tailings cone of my present invention, for wedgingly closing such space and for wedgingly concentrically positioning such troughs and such cone.

One such air separator is shown in my Patent 1,834,095 dated Dec. 1, 1931, in which I have shown and claimed a non-rotary vertically adjustable partition conical wall within the separation chamber and around and adjacent the upper outlet, for gravity return of precipitated particles below the upper outlet, and a rotary and vertically adjustable partition wall below and adjacent the upper outlet and spaced a substantial distance above the lower distribution chamber, and constituting a variable top wall for the upper selection chamber, as distinguished from the rotary bottom wall for such a selection chamber, below it and spaced a substantial distance below the upper outlet and above and adjacent the distributor, for intercepting particles below the selection chamber, and rotatable for rotatably discharging such particles below the selection chamber, and spaced within the separating chamber and across the upward current from the distribution chamber, for laterally deflecting such current below the selection chamber, of my present invention.

My present invention aims to provide improved valve means for varying the separating current without changing the size of the upper outlet opening, and without restricting the current adjacent the lower inlet; and my invention also aims to provide an improved variable distribution chamber, and an improved selection chamber above it in which the current shall flow outwardly from the distribution chamber up into and inwardly through the selecting chamber for facilitating precipitation of coarse particles in advance of the upper outlet, and my invention also aims to provide improved filter sealing means for resisting return of fine material from the settling chamber.

To this end in carrying out the preferred embodiment of my present invention I preferably provide a vertically adjustable annular valve around the outer edge of the fan blades and adjustable across them to vertically vary the space through which the outflowing effluent current may flow to throttle such current around the fan and above the settling chamber, so that the settling chamber will be protected from the back pressure incident to such throttling, and the modified current may flow through the settling chamber and filter and lower inlet without being throttled at these points; and I preferably also provide above the fan spokes a rotary valve inwardly of and encircled by the inner edges of the fan blades for varying the influent space above the spokes through which the current may flow to the fan; and I preferably provide annular conical spacer inner valve seat walls below the filter elements, and laterally extended mutually contactively edged flapper valves for the lower ends of these elements which are wide enough to substantially close the upward communication around the valve seat walls when the flapper valves swing to their closed positions, and I provide various other features of improvement, all of which will be hereinafter more fully set forth with reference to the accompanying drawing, in which Fig. 1 is a side elevation partly in vertical axial section of an air separator embodying the preferred form of my present improvements, Fig. 2 is an enlarged fragmentary outer face view of the filter elements and their valves, Fig. 3 is an enlarged fragmentary horizontal section of the filter elements showing their valves in plan.

Fig. 4 is an enlarged fragmentary vertical section of the filter valves, and

Fig. 5 is a fragmentary plan view of the radially adjustable distributor segments.

Referring to the drawing let A indicate the outer casing enclosing a settling chamber B, C the inner casing or receptacle enclosing a separating chamber D, having an upper outlet E and a lower inlet F communicating with the settling chamber and affording an endless current passage up through and down around the casing C. Let G indicate the rotary distributor for distributing material in the separating chamber D, H the feed pipe for supplying material to be separated, I the tailings cone or lower coarse receptacle spaced below the separating chamber and affording a return current passage J between the upper and lower receptacles, K the dust filter across the return passage, L the fine outlet from the settling chamber, M the coarse outlet from the tailings receptacle, and N the driving mechanism, of an air separator. Let O indicate the blower, P the drive shaft, and Q the drive pulley for revolving the blower and distributor.

These parts may be of any usual or suitable construction for distributing material to be separated within the inner casing C and causing a separating current to circulate up through the casing C down through the settling chamber B and in through the filter K in the form of a vortex ring to separate and float fine material into the settling chamber and drop coarse material into the tailings receiver I.

As shown the casing A has a flat top wall $a$, a cylindrical side wall $b$ carrying the casing C, and a conical apron $c$, closed by a removable lower dust cone $d$, carrying the tailings cone I, and the inner casing C has a flat top $e$ around the outlet E and spaced from the top $a$ and affording between them an annular fanway, an upper cylindrical wall $f$, a downwardly and inwardly inclined intermediate wall $g$, a lower cylindrical wall $h$, and a lower conical wall $i$ around the inlet F.

As shown the lower part of the separating chamber affords a relatively small distribution chamber R around the distributor G, and the upper part of the separating chamber affords a relatively large selection chambers between the distribution chamber and the outlet, and the distributor centrifugally projects the material to be separated across the separating current as it rises through the narrow distribution chamber, from which the current rises and expands in the wide selection chamber to permit large particles to precipitate before the current reaches the upper outlet.

As shown the drive shaft P is a tubular pipe encircling the feed pipe H and carries the distributor G which is preferably vertically adjustable on this pipe as by means of a set screw $j$, so that the height of the distributor can be varied relatively to the distribution chamber, and the drive pipe P is carried by a beveled gear $k$ mounted on a ball bearing $l$ in the gear frame $m$ of the drive mechanism and is revolved by a pinion $n$ driven by the pulley Q.

As shown the blower O is carried by and revolved by the pipe P, by means of a fan hub $o$ carrying the spokes $p$ on which the fan blades $q$ of the fan are mounted.

As shown the filter K comprises inner and outer concentric rows of spaced vertical troughs $r$ in staggered relation, with their hollow outer faces opposed to the inflowing return current and affording between their edges spaces through which the inflowing current may flow, and affording in their hollow faces current voids affording downward ways through which dust entering them may descend across the returning current without molestation thereby, which troughs have valve seats $s$ on their lower ends against which flapper valves $t$ may seat to prevent upflow of current from under the troughs.

According to one feature of my present invention I provide vertically adjustable annular valve means at the effluent side of the blower for vertically throttling the space around the fanway through which the effluent current is permitted to flow, for varying and uniformly annularly discharging and calming the blower agitated current intermediate the blower and the settling chamber.

This may be accomplished in any suitable manner but I prefer to provide a vertically adjustable loose ring valve spaced around the upper outer wall of the separating chamber, and opposite and encircling the outer edges of the fan blades and around and opposite and below and upwardly adjustable across the effluent passage from the fanway, and adjustable vertically more or less across the fanway and the outer edges of the blades to vary or throttle the space above said valve through which outblown current may flow from their edges to the settling chamber. For this I prefer to provide a cylindrical valve T below the fanway and adjustable upwardly across it, and preferably also I provide above and opposite and around and across, and downwardly adjustable across, the outward effluent current discharge passage, a frusto-conical valve U above the fanway and adjustable downwardly across it, to cooperate with the valve T, and affording a beveled downward deflecting wall for directing outflowing current toward the settling chamber, these valves when used together serving to uniformly vary the outlet from the blower to approximately maintain the position of such outlet relatively to the vertical center of the fan blades.

The valve T is loose and spaced sufficiently from the casing C to permit dust to drift between them, and the valve U is loose and spaced sufficiently from the wall b of the outer casing to permit dust accumulating above it to drift downwardly between them, and either of these valves when used alone, or both of them when used together, when, adjusted to their open position, will permit full effluent outflow, and when adjusted toward their closed position will restrict such outflow and correspondingly modify the circulation of the separating current without requiring variation or adjustment of the speed of the blower, and without subjecting the settling chamber and the filter to back pressure incident to such throttling.

According to another feature of improvement my invention preferably provides a rotary valve for varying the space above the fan spokes, and at the influent side of the fan blades through which the separating current may flow to the blades, for varying the fineness of separation, and preferably for use with the effluent valves T and U to vary the intake passage to correspond with variations in the effluent passage afforded by adjustment of the valves T and U or either of them.

This may be accomplished in any suitable manner but preferably I provide a rotary valve V above the fan spokes and within and encircled by the inner edges of the fan blades and vertically adjustable to vary the spaces through which the separating current may flow to these blades.

Preferably the valve V is adjustably mounted on and revolves with the blower, as by being carried by thumb screws W from the spokes p, so that it can be adjusted to more or less restrict the influent opening above the outlet E without varying the size of such outlet, to vary the space through which current rising through the outlet may flow to the fan blades, without varying the size of such outlet, and without throttling the current within the separating chamber.

Preferably for increasing the range of vertical adjustment for the valve V to approximately the full vertical height of the fan blades my invention provides for disposing the blower spokes p at the lower edges of the blades q and for mounting these blades at their lower edges on the spokes so that the blades upstand substantially their entire width above the spokes and afford a high clear influent chamber above the spokes in which the valve V may be adjusted as desired.

When the valve V is used with the valve T or the valve U the requisite throttling for the desired fineness is effected by adjustment of the one or the other or both, and then the valve V is adjusted to adapt the intake of the blower to such adjustment of the effluent valves, to cooperate with these by restricting inflow to the blower to the outflow permitted from it, to avoid waste of power in revolving the blower with a full intake against a restricted outlet.

For uniformly and positively operating the effluent valves by a single manipulation my invention preferably provides for suspending the valve T by down pushing compression rods u rising through the top a and carried by opposite vertically swinging levers v carried by cross shafts w operated by reverse lever arms x connected by a link y to cause the levers v to swing vertically uniformly and simultaneously to uniformly move the valve T up or down, and the levers are operated by a screw z adjusted by a hand wheel or nut X to adjust and hold them as desired.

The valve U may be operated in any suitable manner but I prefer to operate it reversely to and simultaneously with the valve T, and preferably from the latter as by means of a lever Y and link Z.

According to another feature of my invention the flapper valves t, which swing against the valve seats s on the lower ends of the filter troughs r, are wide enough to project beyond the edges of these troughs sufficiently to approximately contact with the edges of the adjacent flapper valves to make an approximate closure against upflow of current between these edges when the valves are in their closed positions, and a sealing, spacer, centering, and continuously laterally extended valve seat wall or ring $a'$, which is preferably conical, is provided at the inner edge of the troughs for making contact with the lower edge of each flapper valve to contact with the wide lower edges of the valves to approximately close the spaces between the troughs when the valves are closed, as best seen in Fig. 2. The sealing rings $a'$ are preferably downwardly and outwardly extended and conical to close the space between and to wedgingly concentrically space the inner and outer rows of the troughs and to outwardly discharge dust from between them, and to cross the space between the inner troughs and the tailings cone I, and to wedgingly receive and fit around the circular open end of the tailings receiver for wedgingly centering this and the filter.

With this construction when the valves are open the troughs may freely discharge their dust, but should back pressure flap the valves toward the troughs the tapered contactive laterally projected side edges of the valves will contact opposite the spaces at the sides of the troughs with such edges of adjacent valves, to close such spaces, and to permit adjacent valves to seat against the valve seats on the ends of the troughs and prevent upflow of current and the lower edges of the valves will set against the annular valve seat or ring $a'$ to prevent upflow of current between the troughs, thus substantially sealing the filter from upflow under and between the troughs until the back pressure has been relieved through the filter above the valves, when they can swing open and permit discharge of dust.

The valves will fluctuate with variations in pressure and vibrate the troughs as the valves open or close with such fluctuations. The upper edges of the inner flapper valves approximately contact with the inner wall of the intermediate valve seat $a'$, when the inner valves close, to approximately close the annular space between such ring and such valves, and the conical inner wall valve seat ring $a'$ will wedge around and contact with the upper edge of the tailings cone I and wedgingly center this and the filter and close the space above the dust chamber between the tailings cone and the filter K. Preferably a horizontally movable vertically flexible valve or flapper ring or cloth b' is hung around the flapper valves so that the cloth may flap against them to close the cracks between them.

Preferably in utilizing my invention the selection chamber outlet is formed with a depending deflector flange c' preferably cylindrical and extending downwardly from the top e and around and encircling the outlet E, for causing the current flowing from the selecting chamber to the outlet to take a downward bend around the lower edge of this wall to centrifugally down throw large particles carried by the current flowing toward the outlet and returning such particles to the precipitation chamber k', and this selection chamber outlet deflector is preferably vertically adjustable to vertically vary its lower edge to more or less vary the extent of the downward curve of the outflowing current.

This may be accomplished in any suitable manner but preferably I provide a vertically adjustable deflector ring d' encircling the outlet flange c' and adjustable to vary its effective depth, and preferably I adjust this from without the outer casing, and simultaneously with and relatively to the adjustment of the valves T and U, so that as the latter are adjusted to throttle the affluent current the outlet deflector will be adjusted to increase the curvature of the current flowing from the selection chamber toward the outlet, and vice versa, so that with a greatly throttled current this curvature will be greater, and with an unthrottled current this curvature will be reduced to the minimum. Preferably the throat deflector d' is carried by a lever e' operated by a compression suspension rod f', from the vertically swinging lever v above it, so that the deflector is moved simultaneously with and to a lesser extent than the outer throttle valve T.

According to another feature of improvement, for use in air separators having radially adjustable distribution and current space variation means, for radially varying distribution of the material to be separated or the current passage in which such material is distributed, for varying separation, my invention provides below and outwardly and inwardly movably radially adjustably mounted on the rotary member of a rotary distributor, a rotary ring consisting of a plurality of radially and circumferentially slidably adjustably overlapped, substantially flat radially adjustably mounted segments, concentric of and radially adjustably mounted on and rotatable with said rotary member, and radially outwardly adjustable around the latter, for rotatably and radially adjustably varying the rotary distributor movably and outwardly and inwardly from below it, to rotatably and radially adjustably vary the space through which the out-thrown material is projected and to rotatably and radially adjustably radially vary the annular current passage around the rotary distributor, to rotatably and radially adjustably vary the separation effected in the separating chamber, preferably by radially slidably mounting such segments below and on the rotary member for making the rotary distributor radially expansive, as by equipping it with a rotary ring consisting of a plurality of radially adjustable radially and circumferentially slidably adjustably overlapped, radially adjustably mounted and attached, sections g' which can be adjusted inwardly or outwardly on and around it to vary its radius with one set of such segments, and without detaching such segments.

According to another feature of improvement my invention provides for vertically varying the height of the distribution chamber for regulating the fineness of separation therein in advance of the selection chamber, which may be accomplished in any suitable manner but for which I preferably provide the distribution chamber with a vertically adjustable rotary annular top wall h' for defining the top of the distribution chamber, which wall is preferably opposite and extended across the current passage around the distributor, and spaced within the separating chamber and around the pipe P, for laterally deflecting such current past said wall under and into the selection chamber, and is preferably adjustably mounted on and revolved with the pipe P so that the wall can be adjusted more or less above the distributor G to afford a variable distribution chamber around the distributor in such a manner that the top wall may be set where desired, and the distributor when vertically adjustable may be adjusted toward or from the wall h'.

According to another feature of improvement the wall h' affords a variable annular rotary bottom wall for the selection chamber as well as a variable top wall for the distribution chamber, so that these two chambers may be relatively varied by adjusting this intermediate wall, which is preferably annular to afford past its inner edge and annular inner current space i' through which large particles precipitated in the precipitation chamber k' may return to the distribution chamber, and is preferably revoluble with the pipe P to rotatably discharge below the selection chamber any particles intercepted by or any sediment precipitating on the wall h'.

According to another feature of improvement my invention preferably provides for preventing the separating current from following a direct path from the separating chamber to the upper outlet from the selection chamber, by rotatably deflecting laterally below the selection chamber the current rising from the distribution chamber so as to cause it to flow away from the outlet from the selection chamber and circle it up one side of and then under the top of the selecting chamber to reach the outlet at the other side thereof, to insure expansion of the air in the large selection chamber and to facilitate precipitation of coarser particles in its circulatory passage up through and across the selection chamber. This may be accomplished in any suitable way, but when the upper outlet from the selection chamber is at the inward part thereof I prefer to provide below the selection chamber a rotary upward and outward annular deflector j' above the distribution chamber for deflecting the current outwardly so that it may flow up the outer wall of the separation chamber and then in under the upper wall e thereof and inward under the deflector d' and upward to the outlet E, to insure its expansion and precipitation of oversize on its way to the outlet.

Preferably the deflector j' is conical and adjustable and is carried by the outer edge of and revolves with the wall h', for rotatably discharging under the selection chamber particles intercepted by the wall j', and is reversible, for rotatably inwardly deflecting such current below the selection chamber and under the upper outlet, for coarse separation.

In operation, the distributor G will be adjusted vertically and radially as desired, and the intermediate wall h' will be adjusted vertically to afford the desired relation between the distribution chamber and the selection chamber. The valves T, U and V will be adjusted to their full open positions, and the blower O will be revolved to cause a separating current to rise through the inner casing and return through the settling chamber. Material to be separated will be supplied to the distributor, and fines will be separated in the distribution chamber, selected in the selecting chamber, and material fine enough to float through these will be outblown into the settling chamber by the fan blades, coarser material dropping through the opening F into the tailings cone.

The tailings will be tested to determine the completeness of separation of the fines, and the distributor and the separating chamber will be adjusted to vary the percentage of fines separated from the tailings. The fineness of the separated dust will be tested, and the selection chamber will be adjusted to select approximately the fineness of dust desired, whereupon the throttle valve T or the bevel valve U or both will be adjusted to calm the blower agitated effluent current and to pass it in an uninterrupted uniform annular stream toward the settling chamber, and to throttle it to vary this approximate fineness to the extent desired, after which the inner fan valve V will be set to correspond with the effective outlet space afforded by the throttle valves. Additional minor variations in fineness from time to time may be easily effected by varying the throttle valves from without by turning the hand wheel X.

It will be seen that my invention provides improvements that can be readily and advantageously availed of, and it will be understood that my invention is not limited to the particular details of construction, arrangement, or combination of features, set forth as constituting its preferred form, since it can be employed in whole or in part according to such modifications, arrangement or combinations, as circumstances or the judgment of those skilled in the art may dictate, without departing from the spirit of the invention.

According to one such modification, when the selection chamber is provided with an inner cross-outlet upper wall affording around its outer edge an upward passage from the selection chamber and above it an inward passage to the upper outlet, I reverse the inclination of the intermediate deflector j' so as to cause this to deflect the current from the distribution chamber inwardly into the selecting chamber so it will flow upwardly and then outwardly under the inner upper wall of the selection chamber to reach the upper outlet, and I dispose the vertically movable deflector d' around the outer edge of the inner upper wall of the separating chamber in such case to cause the current to curve downwardly around the deflector to reach the outer upper current passage, in making which downward curve the air can precipitate large particles into the particle chamber above the inwardly inclined deflector j' and carry the finer particles upwardly and inwardly over the inner upper wall of the selecting chamber, and through the outlet, and in such case I make the deflector d' serve as a valve for varying the space above it and around the inner wall through which such current may flow, and operate it from the same lever v which operates the throttling valve T, which lever is preferably extended at the other side of its fulcrum and connected to the valve V which in such case is non-rotary and is operated by the lever reversely to the other valves to simultaneously cause the valves and the deflector to co-operate on the principle before described.

The top wall a and other parts are usually made of removable separably connected sections, and the chambers and the cones are usually provided with suitable hand holes for affording access to the interior and to permit adjustment and removal of any part. Feet l' preferably support the outer casing and carry brackets m' on which the inner casing is mounted, and the removable lower cone d usually carries the tailings cone I by brackets n' so that both cones can be removed or applied together. Two or more levers v should be used, and these should be spaced around the upper casing to insure uniform and parallel movement of the valves they operate from without the outer casing.

Links or rivets o' preferably connect the flapper valve t to the flexible valves b' for stretching the latter against upfold, and for assuring movement of both together, and the flappers are preferably hinged to the troughs by spring wire pintles r' the expansive upper ends of which engage ears s' on the valves and holes t' in the troughs, and the lower middle portion of which engages the cloth below the flappers, so that the pintles are horizontally movable vertically resistant distender means, which act as stretchers for holding the cloth down between adjacent troughs.

Preferably the edges of the troughs have notches q' in which the upper edge of the cloth valve is held by a wire p' as shown in Fig. 2.

Although for the purpose of illustrating the herein disclosed improvements I have shown them as applied to a separator having a distributor comprising a rotary ring of segmental plates which are radially adjustable by outward and inward movement to vary the space around the distributor, such a distributor comprising outwardly and inwardly adjustable plates is not claimed herein, being claimed in my companion application Serial No. 714,961, filed March 10, 1934 as a continuation in part of this application.

I claim:

1. In a separator, an outer casing enclosing a settling chamber, an inner casing enclosing a separating chamber within and in spaced relation to said outer casing and having an upper current outlet and a lower current inlet communicating with said settling chamber and affording an endless current passage up through said separating chamber and down through said settling chamber, supply means for supplying material to be separated in said separating chamber, revoluble fan spokes and blades between said casings for causing a fluid current to flow up through said separating chamber and upper outlet into said settling chamber and return through said lower inlet to separate and float fine material from said separating chamber, and a vertically adjustable radially outwardly extended valve above said spokes and inwardly of the inner edges of said blades and opposite and above said outlet for vertically varying the space below said valve through which such current may flow to said outlet to said blades for varying such current for varying the fineness of such separation.

2. In a separator, an outer casing enclosing a settling chamber, an inner casing enclosing a separating chamber within and in spaced relation to said outer casing and having an upper current outlet and a lower current inlet communicating with said settling chamber and affording an endless current passage up through said separating chamber and down through said settling chamber, supply means for supplying material to be separated in said separating chamber, revoluble fan blades between said casings for causing a fluid current to flow up through said separating chamber and upper outlet into said settling chamber and return through said lower inlet to separate and float fine material from said separating chamber, comprising spaced spokes and upstanding fan blades upstood at their lower edges on said spokes and upstanding substantially their entire width above said spokes and affording above said spokes and within the inner edges of said blades a substantial influent chamber communicating from said outlet to said blades, and a vertically adjustable outwardly extended plate valve above said spokes and inwardly of said blades and vertically adjustable to vertically vary said influent chamber to vary such current to vary the fineness of such separation.

3. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings for causing a fluid current to flow up through said separating chamber and upper outlet into said settling chamber and to return through said lower inlet to separate and float fine material from said separating chamber, filter means across the path of such current for intercepting material floating therein comprising laterally spaced vertically extended troughs having outer hollow faces opposed to the direction of flow of such current, a downwardly extended valve seat wall inwardly of and adjacent and connected to the lower portions of said troughs and continuously laterally extended past said troughs and across the lateral spaces between said troughs, for laterally spacing said troughs, and for affording a lateral continuous valve seat inwardly of said troughs, and horizontally movable vertically flexible laterally extended valve means at the outer sides of said troughs, laterally extended across said troughs and across the lateral spaces between said troughs, for resisting inflow of such current between said spaces, and horizontally movable against said wall for closing the lower ends of said troughs and the lateral spaces between said troughs, for resisting upflow of said current within said troughs and through the lateral spaces between said troughs, and horizontally movable vertically resistant valve distender means carried by and horizontally movable with said vertically flexible valve, for vertically distending said valve during such horizontal movement of said valve.

4. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings for causing a fluid current to flow up through said separating chamber and upper outlet into said settling chamber and to return through said lower inlet to separate and float fine material from said separating chamber, filter means across said passage for intercepting material floating in such current comprising laterally spaced vertically extended troughs having hollow outer faces opposed to the direction of flow of such current, a laterally extended inner valve seat wall adjacent the inner sides of said troughs and laterally extended past said troughs and across the lateral spaces between said troughs, for affording a continuous valve seat inwardly of and across said troughs and said spaces, and laterally projected individually swingable flapper valve means across the outer side of said troughs respectively, each horizontally swingable against said wall for closing the lower end of its trough, and each laterally extended across its trough and partially across the spaces between two adjacent of said troughs, and having laterally contactive side edges opposite said spaces and laterally contactive with the side edges of adjacent of said flapper valves, said edges co-operable for closing the lateral spaces between said troughs, for mutually resisting upflow of current within and between said troughs.

5. In a separator, an outer casing having a top wall and a side wall enclosing a settling chamber, an inner casing having a top wall and a side wall enclosing a separating chamber, within and in spaced relation to said outer casing and having an upper current outlet and a lower current inlet in communication with said settling chamber and affording an endless current passage up through said separating chamber and down through said settling chamber, comprising an upper outward effluent current passage between said top walls, a downward current passage between said side walls, and a lower return current passage, supply means for supplying material to be separated in said separating chamber, and fan blades between said casings, revoluble in the space between said top walls, for causing a fluid current to flow up through said separating chamber and upper outlet, out through said outward passage, and down through said downward passage into said settling chamber, and to return through said lower passage, to separate and float fine material from said separating chamber, in combination with a circular, vertically adjustable outer valve, uninterruptedly extended around the outer edges of said blades in the space between said casings above and spaced from said lower passage, and adapted to afford an uninterrupted, vertically variable space outwardly of said blades through which said current may flow from said blades to said settling chamber for varying said current uninterruptedly, outwardly of said blades, to vary said separation.

6. In a separator according to claim 5, said vertically adjustable outer valve being outwardly of the outer edges of said blades and being extended above said outward passage, and being downwardly adjustable outwardly of said edges and across said outward passage, and adapted to downwardly vary the space outwardly of said blades through which said current may flow from said outward passage to said downward passage.

7. In a separator according to claim 5, said vertically adjustable outer valve having an uninterrupted annular downwardly and outwardly extended inner face opposite and around said outward passage and outwardly of and concentric with the outer edges of said blades, and opposite and above said downward passage, and adapted to intercept said current outwardly of said edges and to downwardly deflect said current outwardly of said outward passage and above and into said downward passage, and vertically adjustable relatively to said outward passage, and adapted to vertically vary said deflection.

8. In a separator according to claim 5, said vertically adjustable outer valve being concentric of and uninterruptedly extended below said outward passage, and adapted to afford a continuous circular space above said valve in communication from said outward passage to said settling chamber and being upwardly adjustable into said outward passage, and adapted to upwardly vary said space outwardly of said blades through which such current may flow above said valve from said blades to said settling chamber.

9. In a separator according to claim 5, said vertically adjustable outer valve being continuously extended around said inner casing below said outward passage and above said lower passage and inwardly of said downward passage, and adapted to inwardly define the latter, and being slidably mounted on said inner casing, and upwardly slidable thereon below said outward passage, and adapted to vertically vary the effective height of said downward passage.

10. In a separator, an outer casing having a top wall and a vertical cylindrical side wall enclosing a settling chamber, an inner casing having a top wall and a side wall enclosing a separating chamber within and in spaced relation to said outer casing and having an upper current outlet and a lower current inlet in communication with said settling chamber, affording an endless current passage up through said separating chamber and down through said settling chamber, comprising an outward effluent current passage between said top walls and a downward current passage between said side walls, supply means for supplying material to be separated in said separating chamber, revoluble fan blades between said casings and revoluble in the space between said top walls, for causing a fluid current to flow up through said separating chamber and upper outlet, and out through said outward effluent passage and down through said downward passage into said settling chamber, and to return through said lower inlet, to separate and float fine material from said separating chamber, and a vertically adjustable conical valve, within and encircled by and vertically slidable within said vertical cylindrical side wall, and above said settling chamber, and without and around said downward current passage, for outwardly defining said downward current passage, and spaced without and around and extended below the outer edges of said blades, and affording below said valve a space through which such current may outflow from said blades, and adjustable vertically relatively to said separating chamber, for vertically varying the height of said downward current passage through which such current may flow from said blades to said settling chamber, for varying such current, for varying the fineness of such separation.

11. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated to said separating chamber, revoluble fan spokes and blades between said casings, for causing a fluid current to flow up through said separating chamber and upper outlet into said settling chamber and to return through said lower inlet, to separate and float fine material from said separating chamber, and an outwardly extended plate valve above said spokes and inwardly of and encircled by the inner edges of said fan blades, for varying the space below said plate valve through which such current may flow to said blades, for varying such current, for varying the fineness of such separation.

12. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings, for causing a fluid current to flow up through said separating chamber and upper outlet into said settling chamber, and to return through said lower inlet, to separate and flow fine material from said separating chamber, and a rotary, vertically adjustable, outwardly extended, inner valve, inwardly of the inner edges of said blades and opposite and outwardly extended above said outlet, rotatable inwardly of said inner edges, for rotatably outwardly discharging said fine material from said valve inwardly of and toward said edges, and vertically adjustable relatively to said outlet, and adapted to vary the space below said valve and opposite said outlet through which said current may flow from said outlet to said blades, for varying said current, for varying said separation.

13. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan spokes and blades between said casings, for causing a fluid current to flow up through said separating chamber and upper outlet into said settling chamber, and to return through said lower inlet, to separate and float fine material from said separating chamber, and an outwardly extended rotary and vertically adjustable valve carried by and above and revoluble with said spokes, and vertically adjustable toward said spokes, for varying the space below said valve and above said spokes through which such current may flow to said blades, for varying the fineness of such separation, and rotatable for rotatably discharging such fine material from said valve above said spokes.

14. In a separator, comprising a casing enclosing a separating chamber having an upper selection chamber, an upper current outlet, a lower distribution chamber, and a lower current inlet, supply means for supplying material to be separated in said distribution chamber, blower means for causing a fluid current to enter said separating chamber at said inlet and to flow up through said distribution chamber and said selection chamber and through said outlet, for separating and floating fine material from said separating chamber, and a circular distributor spaced within and concentric of said distribution chamber, for distributing said materal therein, and for defining around said distributor an annular upward passage for said current; the combination therewith of a cross-passage, rotary, transverse, lower wall within said separating chamber, opposite and above and extended transversely a substantial distance across said upward passage, below said selection chamber and spaced a substantial distance below said outlet, and above said distribution chamber and spaced above and adjacent said distributor, and adapted to partition said selection chamber from direct upward communication with said passage, and to laterally deflect said current from said passage below and into said selection chamber, for intercepting particles in said current below said selection chamber, and for rotatably discharging said particles underneath the latter.

15. In a separator according to claim 14, said cross-passage, rotary, transverse, lower wall being vertically adjustable and adapted to vertically vary said deflection, said interception, and said discharge.

16. In a separator according to claim 14, said cross-passage, rotary, transverse, lower wall having an annular inner current passage edge above and spaced from said distributor, and adapted to laterally inwardly up-pass said current inwardly of said inner edge and above said distributor.

17. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings, for causing a fluid current to flow up through said separating chamber and upper outlet, into said settling chamber, and to return through said lower inlet, to separate and float fine material from said separating chamber, said separating chamber comprising a lower distribution portion enclosing a distribution chamber, and an upper selection portion enclosing a selection chamber, a circular distributor within and concentric of and spaced within said distribution chamber, for defining around said distributor an annular upward current passage for such current, and for distributing such material in said annular passage, and a rotary, inclined, current lateral deflector, annular wall, within said separating chamber, above said distribution chamber and below said selection chamber, and opposite and above said annular current passage, having an upwardly inclined edge within and spaced within said separating chamber, and affording past said edge an upward passage for such current in communication from said distribution chamber to said selection chamber, and inclined from said upper outlet, for directing such current from said distribution portion away from said outlet as such current enters said selection portion, to cause such current to circulate laterally through said selection portion as such current flows to said outlet, for precipitating coarser particles floating in such current in advance of said outlet, and rotatable for rotatably outwardly discharging below said selection chamber such particles precipitated on said rotary inclined deflector wall.

18. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings, for causing a fluid current to flow up through said separating chamber and upper outlet into said settling chamber, and to return through said lower inlet, to separate and float fine material from said separating chamber, said separating chamber having a lower portion enclosing a distribution chamber, and having an upper portion enclosing a selection chamber, a circular distributor within and concentric of and spaced within said distribution chamber, for defining around said distributor an annular upward passage for such current, and for distributing such material in said annular passage, and a reversible, substantially conical, rotary, annular, transverse current deflector, wall, reversibly mounted within and concentric of and in spaced relation to said separating chamber, opposite and above said annular current passage for intercepting and transversely deflecting such current upflowing through said passage, and affording past each edge of said wall a lateral current passage in communication from said annular current passage to said selection chamber, spaced a substantial distance below said upper outlet, and adjacent and spaced above said distributor, and intermediate said portions, affording a current lateral deflector lower wall for said selection chamber, and a current lateral deflector upper wall for said distribution chamber, for laterally deflecting flow of such current from said distribution chamber to said selection chamber, and reversible for varying the direction of such deflection, for varying such separation, and rotatable, for rotatably discharging unseparated material from said wall below said selection chamber.

19. In a separator according to claim 14, said cross-passage, rotary, transverse, lower wall being flat below said selection chamber and above and opposite said upward passage, and adapted to transversely intercept said current, and to transversely discharge said particles, below said selection chamber.

20. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings, for causing a fluid current to flow up through said separating chamber and upper outlet into said settling chamber, and to return through said lower inlet, to separate and float fine material from said separating chamber, filter means across the path of such current, comprising spaced parallel inner and outer successive rows of laterally spaced and relatively laterally staggered vertically extended troughs having hollow outer faces opposed to the direction of flow of such current, and an inclined downwardly and outwardly extended spacer wall intermediate adjacent rows of said troughs, laterally extended across said troughs and across the lateral spaces between said troughs, and having an upper edge adjacent the outer edges of said inner troughs and a lower edge adjacent the inner side of said outer troughs, and downwardly and outwardly extended across the space between said inner and outer rows of troughs, for successively spacing said rows, and across the space between said successive rows for vertically closing such space, for resisting flow of current upwardly between such rows, and for downwardly and forwardly conducting fine material from said rows.

21. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings, for causing a fluid current to flow up through said separating chamber and upper outlet into said settling chamber, and to return through said lower inlet, to separate and float fine material from said separating chamber, a tailings receiver having a circular open upper end spaced around said inner casing, for defining a return current passage around said inlet, annular filter means spaced around said receiver, for intercepting material floating in such current, comprising a circular series of circumferentially spaced vertically extended troughs across the path of such current, having hollow outer faces opposed to the direction of flow of such current, and an upwardly and inwardly extended annular conical wall, within and carried by, and connected to the lower portions of said troughs, for circumferentially spacing said troughs, and around said open end of said receiver, and extended upwardly and inwardly across the radial space between the inner side of said troughs and said open end of said receiver, for closing the radial space between said troughs and said receiver, for resisting upflow of such current between said troughs and said open end, and conically wedgingly fitted around said open end, for conically encircling said open end and for wedgingly concentrically relatively centering said troughs and said receiver.

22. In a separator, an outer casing enclosing a settling chamber, an inner casing enclosing a separating chamber within and in spaced relation to said outer casing and having an upper current outlet and a lower current inlet in communication with said settling chamber and affording an endless current passage up through said separating chamber and down through said settling chamber, supply means for supplying material to be separated in said separating chamber, revoluble fan blades between said casings, for causing a fluid current to flow up through said separating chamber and upper outlet into said settling chamber, and to return through said lower inlet, to separate and float fine material from said separating chamber, annular filter means across said passage, for intercepting material floating in such current, comprising vertically extended circumferentially spaced troughs having their hollow outer faces opposed to the direction of flow of such current, an annular valve seat inner wall adjacent said troughs and inwardly of and extended across the circumferential spaces between the lower ends of said troughs, for affording a continuous annular valve seat inwardly of their lower ends, and laterally projected, inwardly swingable, flapper valve means across the outer side of said troughs respectively, each laterally extended across the hollow face of its trough and laterally partially across the spaces between said troughs, and each individually swingable toward said inner wall, for resisting upflow of such current within its trough, and all collectively swingable against said annular inner wall, for collectively resisting upflow of such current within and between said troughs, said flapper valve means having downwardly converged laterally contactive side edges opposite and across said spaces, for permitting their collectively swingable movement against said annular wall, said edges contactable with and cooperable with those of the adjacent flapper valve means, for mutually closing the spaces between said troughs, for resisting upflow of such current through such spaces.

23. In a separator, an outer casing enclosing a settling chamber, an inner casing enclosing a separating chamber within and in spaced relation to said outer casing and having an upper current outlet and a lower current inlet in communication with said settling chamber, and affording an endless current passage up through said separating chamber and down through said settling chamber, supply means for supplying material to be separated in said separating chamber, revoluble fan blades between said casings, for causing a fluid current to flow up through said separating chamber and upper outlet into said settling chamber, and to return through said lower inlet, to separate and float fine material from said separating chamber, filter means comprising vertically extended laterally spaced troughs across said passage, for intercepting fine material floating in such current, said troughs having hollow outer faces opposed to the direction of flow of such current, a valve seat wall connected to the lower portion of said troughs and continuously extended laterally of said troughs and across the lateral spaces between said troughs, for laterally spacing said troughs, at the inner sides of said troughs, and affording a continuously laterally extended valve seat inwardly of the latter, and horizontally swingable laterally extended flapper valve means at and horizontally swingable toward the outer sides of and laterally extended across said troughs and across the spaces between said troughs, for resisting inflow of such current through the lateral spaces between such troughs, and movable against said wall, for resisting upflow of such current within and between said troughs.

GEORGE HOLT FRASER.